(12) United States Patent
Bekolay

(10) Patent No.: US 10,026,395 B1
(45) Date of Patent: Jul. 17, 2018

(54) METHODS AND SYSTEMS FOR EXTRACTING AUDITORY FEATURES WITH NEURAL NETWORKS

(71) Applicant: Applied Brain Research Inc., Waterloo (CA)

(72) Inventor: Trevor Bekolay, West Lebanon, NH (US)

(73) Assignee: Applied Brain Research Inc., Waterloo (CA)

( * ) Notice: Subject to any disclaimer, the term of this patent is extended or adjusted under 35 U.S.C. 154(b) by 0 days.

(21) Appl. No.: 15/400,401

(22) Filed: Jan. 6, 2017

(51) Int. Cl.
G10L 15/16 (2006.01)
G10L 15/02 (2006.01)
G10L 25/21 (2013.01)
G10L 19/02 (2013.01)
G10L 25/24 (2013.01)

(52) U.S. Cl.
CPC .............. *G10L 15/02* (2013.01); *G10L 15/16* (2013.01); *G10L 19/0204* (2013.01); *G10L 25/21* (2013.01); *G10L 25/24* (2013.01)

(58) Field of Classification Search
CPC ........ G10L 15/02; G10L 15/065; G10L 17/18
USPC .................................... 704/200–275
See application file for complete search history.

(56) References Cited

U.S. PATENT DOCUMENTS

| | | | | |
|---|---|---|---|---|
| 2004/0122665 A1* | 6/2004 | Huang | ............ | G10L 15/02 704/227 |
| 2004/0236570 A1* | 11/2004 | Tato | ............ | G10L 15/02 704/206 |
| 2008/0300875 A1* | 12/2008 | Yao | ............ | G10L 15/065 704/236 |
| 2009/0177468 A1* | 7/2009 | Yu | ............ | G10L 15/02 704/233 |
| 2015/0127336 A1* | 5/2015 | Lei | ............ | G10L 17/18 704/232 |

\* cited by examiner

*Primary Examiner* — Huyen Vo
(74) *Attorney, Agent, or Firm* — Elan IP Inc.

(57) ABSTRACT

A system extracting features from a time-varying signal comprising a computer processor and a computer readable medium having computer executable instructions for providing: a bank of bandpass filters; a module approximating the output of those filters with nonlinear components; a module representing a decorrelated projection of the output of the filters with nonlinear components; and a module representing the temporal derivative of the decorrelated information with nonlinear components.

14 Claims, 3 Drawing Sheets

METHODS AND SYSTEMS FOR EXTRACTING AUDITORY FEATURES WITH NEURAL NETWORKS

FIELD OF THE INVENTION

The present invention relates to the field of signal processing using neural networks, and in particular to implementing speech recognition and other subfields of artificial intelligence that require extraction of auditory features of signals that vary rapidly over time.

BACKGROUND OF THE INVENTION

Speech recognition attempts to label continuous audio signals with discrete labels (typically phones or words). Many properties of speech audio signals corresponding to discrete labels vary depending on the speaker, the tone of the utterance, the linguistic context of the phone or word, and other factors. Features of the spectrogram of the audio signal, however, are conserved across many of these contextual factors. Spectral information is therefore extracted by both artificial speech recognition systems and the human ear as a pre-processing step in speech perception.

The power spectrum of a short (10-50 ms) sample of an audio signal containing speech typically has at least two or three identifiable peaks, called formants. There will also be power in frequencies near these peaks; in general, this information is redundant and can be considered noise, as the formants are sufficient to differentiate most speech sounds. The power spectrum, therefore, contains both useful signals and noise correlated with that useful signal.

In order to increase the signal-to-noise ratio, the power spectrum can be decorrelated by projecting it onto a set of basic functions using inverse Fourier techniques. The coefficients on these basis functions are called "cepstral coefficients," and are the most frequently used feature vector representations for automatic speech recognition systems.

Cepstral coefficients and other feature vectors form the "frontend" of an automatic speech recognition system. The "backend" assigns discrete phone and word labels to sequences of feature vectors using statistical techniques. Currently, artificial neural networks are the primary computational model used in the backend of successful speech recognition systems.

Spiking neural networks are a class of artificial neural networks that have seen recent success in image classification and control problems (Hunsberger and Eliasmith, 2015; DeWolf, 2015). In addition to being well-suited for continuous temporal situations, they communicate through asynchronous transmission of information packets (i.e., spikes). Asynchronous communication through a large number of simple neural units operating in parallel has been implemented in a class of hardware devices called neuromorphic systems. Neuromorphic systems simulate spiking neural networks using orders of magnitude less power than traditional computing devices.

Implementing an efficient frontend representing auditory signals and features of those signals in spiking and non-spiking networks would permit unified realization of a speech recognition system, allowing efficient systems to be built. For example, a spiking frontend can be efficiently realized in neuromorphic hardware.

SUMMARY OF THE INVENTION

In a first aspect, the present invention uses an artificial neural network to decorrelate spectral information derived from audio signals using auditory filters. The incoming audio signal is provided to the auditory periphery model. The auditory periphery model determines the frequency content of the signal in the recent past. The output of the auditory periphery model is provided to the artificial neural network through a filter. In some embodiments, the filter used is analogous to a biological synapse. The artificial neural network represents spectral information and transforms it to cepstral information through the connections between two or more layers of neurons. The connection weights between the two layers of neurons are determined by error-driven learning rules or offline optimization methods. Unlike other approaches to decorrelation in neural networks, the transformation from spectral information to cepstral information is implemented through decorrelating the representations in the first layer of neurons, which may or may not result in decorrelating neural activity.

In some cases, the neural nonlinearities used by the artificial neural net-work are non-spiking. In some cases, the neural nonlinearities are spiking, meaning that information is transmitted using asynchronous packets communicated between neurons.

In some cases, the auditory periphery model is computed with general purpose computing devices through software algorithms emulating the function of the human auditory periphery. In some cases, the auditory periphery model is computed with special purpose computing devices designed to emulate the function of the human auditory periphery (e.g., silicon cochlea and other neuromorphic audio sensors).

In some cases, the artificial neural network is computed with general purpose computing devices through software algorithms emulating the function of biological neurons. In some cases, the artificial neural network is computed with special purpose computing devices designed to emulate the function of biological neurons (neuromorphic hardware).

In a second aspect, some embodiments of the system are connected to an artificial neural network that detects changes in the decorrelated cepstral information over time (Tripp and Eliasmith, 2010). The temporal derivative of the cepstral information, often called delta cepstral coefficients in speech recognition literature, is computed using one of the network structures shown in FIG. 2.

The invention accordingly comprises a general network structure in which the connection weights between the neurons in the network are determined automatically. Specific networks are embodied using general purposes computing devices or on neuromorphic hardware.

In one embodiment of the invention, there is provided a method for extracting auditory features from a time-varying signal using neural networks including encoding an artificial neural network of layers of computer-represented neurons implemented on a computer system to have an auditory filter bank receiving an input audio signal, an auditory nerve layer coupled to the auditory filter bank and a cepstral coefficient layer coupled to the auditory nerve layer; decomposing the input audio signal into frequency spectrum data using an auditory filter bank that detects power at a set of predetermined frequencies; representing the detected power at each of the predetermined frequencies with the auditory nerve layer; decorrelating the detected power at each of the predetermined frequencies and representing the decorrelated information with the cepstral coefficient layer by determining cepstral coefficients for each frequency; computing by the computer system the derivative of cepstral coefficients from the cepstral layer; generating an auditory feature vector from a concatenation of decoded vector outputs of the cepstral coefficient layer and the derivative layer.

In one aspect the method further includes bypassing the auditory nerve layer.

In another aspect, coupling weights between two or more layers of neurons are determined through error-driven learning rules.

In another aspect, coupling weights between two or more layers of neurons are determined through an offline optimization method.

In another aspect, the auditory filter bank comprises a set of bandpass filters and each bandpass filter is based on a model of an auditory periphery.

In another aspect, coupling weights between the auditory nerve layer and the cepstral coefficient layer decorrelate decoded information in the auditory nerve layer, approximating an inverse discrete cosine transform.

In another aspect, the cepstral coefficient layer is coupled to a temporal derivative layer representing the temporal derivative of the cepstral coefficient layer; wherein the temporal derivative layer includes a plurality of nonlinear components.

In another aspect, the temporal derivative layer is organized in a feedforward manner with multiple couplings between layers within the temporal derivative layer.

In another aspect, the temporal derivative layer is organized by using additional layers within the temporal derivative layer to delay signal propagation.

In another aspect, the temporal derivative layer is organized in a recurrent manner.

In another embodiment of the invention, there is provided a system for signal processing in neural networks comprising an artificial neural network of layers of computer-represented neurons implemented on a computer system to have an auditory filter bank receiving an input audio signal, an auditory nerve layer coupled to the auditory filter bank and a cepstral coefficient layer coupled to the auditory nerve layer; wherein:

each layer comprises a plurality of nonlinear components, and each nonlinear component is configured to generate an output in response to the input;

output from each nonlinear component is weighted by coupling weights of corresponding weighted couplings and weighted outputs are provided to coupled modules for each layer;

and wherein the system is configured to decompose the input audio signal into frequency spectrum data using the auditory filter bank that detects power at a set of predetermined frequencies; represent the detected power at each of the predetermined frequencies with the auditory nerve layer; decorrelate the detected power at each of the predetermined frequencies and representing the decorrelated information with the cepstral coefficient layer by determining cepstral coefficients for each frequency; compute the derivative of cepstral coefficients from the cepstral layer; generate an auditory feature vector from a concatenation of decoded vector outputs of the cepstral coefficient layer and the derivative layer.

In one aspect of this embodiment, each nonlinear component has a tuning curve that determines the output generated by the nonlinear component in response to any input and the tuning curve for each nonlinear component may be generated randomly.

In another aspect of this embodiment, the nonlinear components are software simulations of neurons.

In another aspect of this embodiment, the simulated neurons generate spikes.

In another aspect of this embodiment, the components are implemented in special-purpose hardware including silicon cochleas and neuromorphic hardware.

BRIEF DESCRIPTION OF THE DRAWINGS

For a more complete understanding of the invention, reference is made to the following description and accompanying drawings, in which.

DETAILED DESCRIPTION OF EXEMPLARY EMBODIMENTS

Figure 1:
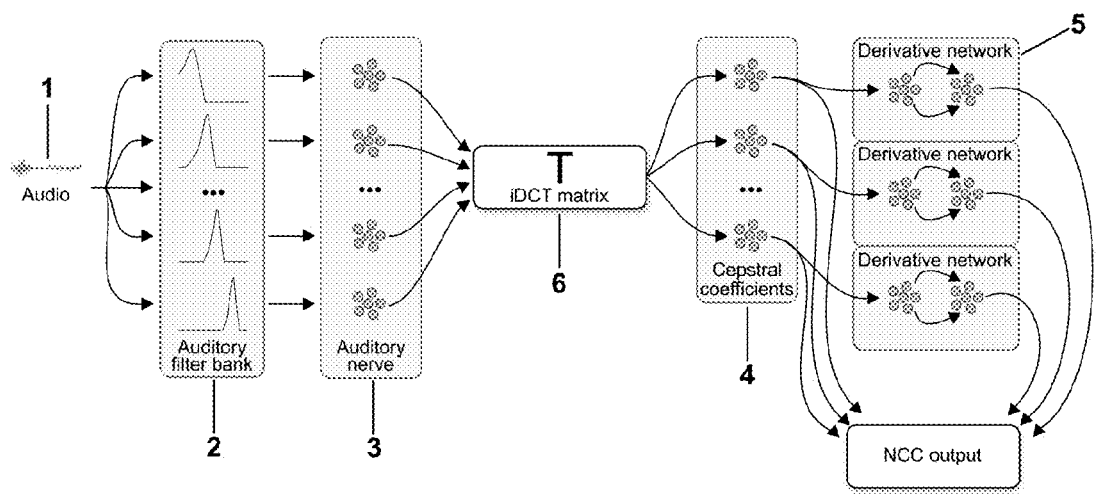
FIG. 1 is a diagram of the overall architecture of the system.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in anyway, but rather as merely describing the implementation of various embodiments as described.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. Program code is applied to input data to perform the functions described herein and to generate output information. The output information is applied to one or more output devices, in known fashion.

Furthermore, the systems and methods of the described embodiments are capable of being distributed in a computer program product including a physical, nontransitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer usable instructions may also be in various forms, including compiled and non-compiled code.

It should also be noted that the terms coupled or coupling as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term communicative coupling may be used to indicate that an element or device can electrically, optically, or wirelessly send data to another element or device as well as receive data from another element or device.

The described embodiments are methods, systems and apparatus that generally provide for performing decorrelation using nonlinear distributed elements. As used herein the term 'neuron' refers to spiking neurons, continuous rate neurons, or arbitrary nonlinear components used to make up a distributed system.

The described systems can be implemented using a combination of adaptive and non-adaptive components. The system can be efficiently implemented on a wide variety of distributed systems that include a large number of nonlinear components whose individual outputs can be combined together to implement certain aspects of the system as will be described more fully herein below.

Examples of nonlinear components that can be used in various embodiments described herein include simulated/artificial neurons, FPGAs, GPUs, and other parallel computing systems. Components of the system may also be implemented using a variety of standard techniques such as by using microcontrollers. Also note the systems described herein can be implemented in various forms including software simulations, hardware, or any neuronal fabric. Examples of mediums that can be used to implement the system designs described herein include Neurogrid, Spinnaker, OpenCL, and TrueNorth.

Previous approaches to decorrelation in neural networks (e.g., Tetzlaff et al., 2012) focus on the decorrelation of network activity, rather than attempting to implement the same decorrelation algorithms used in digital signal processing. As such, it is not clear how previous approaches relate to algorithms that have been successfully applied in the domain of speech recognition. By contrast, the present invention interprets network activity as a vector of numbers, which can be transformed through neural approximations of traditional mathematical manipulations implemented through the connections between ensembles of neurons.

The general network structure consists of a feedforward pipeline of neural network layers, and is depicted in FIG. 1. The audio signal input [1] is decomposed into frequency spectrum information in a manner analogous to the human auditory periphery, embodied in a bank of auditory filters [2], for which many specific auditory filters currently exist, including but not limited to Gammatone filters, Gammachirp filters, and the dual resonance nonlinear filter (Johannesma, 1972; De Boer, 1975; Patterson, 1976; Irino and Patterson, 1997; Unoki et al., 2001; Lopez-Poveda and Meddis, 2001). The auditory filter model produces as output the activity of inner hair cells, which reflects the amount of displacement at the portion of the basilar membrane to which an inner hair cell is connected. The basilar membrane and the rest of the cochlea is shaped such that incoming air pressure waves (i.e., sounds) displace the basilar membrane at the base for air pressure waves with high-frequency components, and at the apex for air pressure waves with low-frequency components. The auditory filter bank therefore performs a frequency decomposition of the audio signal, similar to a bank of narrow bank-pass filters.

The inner hair cell activity produced by the auditory filter bank [2] is provided as input to a layer of auditory nerve neurons [3] whose activity reflects spectral information overtime. This activity corresponds to the activity of neurons efferent to the auditory nerve. The auditory nerve layer [3] projects to the cepstral coefficient layer [4], which represents cepstral information over time. The cepstral coefficient layer projects to derivative subnetworks [5] that compute the derivative of the cepstral coefficients. The auditory feature vector used as input to a speech recognition system is the concatenation of the decoded vector outputs of the cepstral coefficient layer and the derivative layer. More than one derivative network can be used, taking in the input from the previous derivate layer, giving the next temporal derivative and lengthening the feature vector by the number of cepstral coefficients used.

Figure 2:
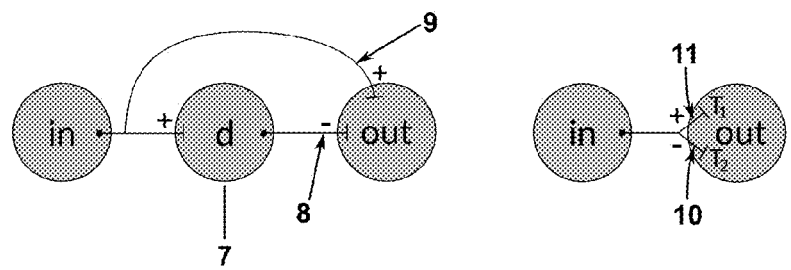
FIG. 2 is a prior art diagram of two possible architectures for the derivative layer of the system.

The derivative subnetworks are implemented in two different feed-forward manners, as depicted in FIG. 2 (Tripp and Eliasmith, 2010). In both cases, the input signal is projected from one layer to another layer twice, with one projection scaled negatively and delayed for a short time. In one type of network, the delay is accomplished through an intermediate layer of neurons [7], which arrives in the output layer slightly delayed [8] compared to the direct connection [9], implementing the derivative computation. In the other type of network, the delay is accomplished through using a different synaptic filter on the projection to be delayed [10] compared to the non-delayed projection [11].

The feature vectors produced by the model are called Neural Cepstral Coefficients (NCCs), and include the cepstral coefficients, and zero or more cepstral coefficient derivatives.

In order to represent and transform vector signals using neuron models, we use the principles of the Neural Engineering Framework (NEF). First, the inner hair cell activity is filtered by one of many synapse models (Eliasmith and Anderson, 2004), and then encoded by an ensemble of neurons by injecting current J according to the equation:

$$J = \alpha_i e_i x + J_i^{bias} \qquad (1)$$

In equation (1), $\alpha_i$ is the gain associated with neuron i, $e_i$ is the encoder associated with neuron i, x is the input signal, and $J_i^{bias}$ is a bias current injected in neuron i (bolded variables denote that the quantity could be a vector or matrix). Each ensemble of neurons is sensitive to a signal, be it power at a particular frequency, or a cepstral coefficient. The terms in equation (1) summarize the ways in which individual neurons respond differently to the same signal. $\alpha_i$ denotes how sensitive a neuron is to that signal; $e_i$ denotes if a neuron is inhibited or excited by the signal; and $J_i^{bias}$ denotes the amount of current at which there will be no neural activity.

The activity of a neuron can be calculated based on the input current, J, and a nonlinear neuron model G, yielding the activity of each neuron $\alpha_i$ as $$\alpha_o = G[J] \qquad (2)$$

Possible algorithms for computing the neuron model G include, but are not limited to, the non-spiking sigmoid nonlinearity (Hopfield, 1984), and the spiking leaky integrate-and-fire model (Lapicque, 1907).

For the auditory nerve layer [3] and cepstral coefficients layer [4], neurons are randomly assigned an encoder $e_i$ of either [1] or [−1].

Layers other than the auditory nerve layer receive input from other layers of neurons, rather than from external sources like the auditory filter (e.g., the cepstral coefficient layer [4]). For these layers, input can be provided in two ways: through a full connection weight matrix defining the strengths of connections between each pair of neurons in the two layers, or through a factored weight matrix, first decoding the output of one layer then encoding the decoded value in the second layer.

For either method of communicating between ensembles of neurons, we use linear decoders solved for with least-squares minimization, as in the transformation principle of the NEF (Eliasmith and Anderson, 2004). These decoders map from the neural activity space to the vector space of interest. One method for solving for these decoders is:

$$\Gamma_{ij} = \int a_i a_j dx$$

$$\gamma_j = \int a_j f(x) dx$$

$$d^{f(x)} = \Gamma^{-1} \gamma \qquad (3)$$

In equation (3), $a_i$ is the activity of neuron i, $a_j$ is the activity of neuron j, and f(x) is some possibly nonlinear function of the input signal x. f(x)=x is also a valid function that is used to implement communication channels between layers of neurons.

Minimizing the L2 norm as in equation (3) is one of many ways to obtain linear decoders. Other methods include, but are not limited to, L0 and L1 norm minimization, which yield linear decoders with different properties. Any minimization technique or method for determining linear decoders can be used.

The decoders $d^{f(x)}$ can be used to estimate f(x) given the activity of the ensemble of neurons, which can then be encoded by another ensemble of neurons. The input signal to the second layer of neurons, y, is a linear sum:

$$y = \hat{f}(x) = \sum_i a_i d_i^{f(x)} \qquad (4)$$

The input signal y is then encoded in the second layer of neurons using equations (1) and (2). While this is a two-step process, it involves two relatively low-dimensional vector-matrix multiplies, which are fast and memory efficient.

The decoders $d^{f(x)}$ can also be used to determine a full connection weight matrix between two layers of neurons, accomplishing the above decode-encode process in a single step. The connections weights between the two layers are $$\omega_{ij} = \alpha_j e_j d_i^{f(x)} \qquad (5)$$

The transformation between the two layers can then be done as:

$$\alpha_i = \sum_i \alpha_i \omega_{ij} \qquad (6)$$

While this results in a one-step process, ω is an i×j connection weight matrix, resulting in a slower and less memory efficient algorithm because dimensionality is typically many times smaller than the number of neurons in an ensemble. However, using the full connection weight matrix is necessary for some pieces of neuromorphic hardware.

In all of the connections between layers of ensembles (see FIG. 1) the function computed across the connection (i.e., the f(x) used when solving for decoders, $d^{f(x)}$ is the identity function, f(x)=x. However, a linear transform matrix T [6] is applied to the connection between the auditory nerve layer and the cepstral coefficients layer. In the factored weight matrix case, equation (4), each term in the summation is multiplied with the appropriate row of T. In the full connection weight matrix case, equation (6) becomes:

$$\omega_{ij} = \alpha_j e_j T_{ji} d_i^{f(x)} \qquad (7)$$

The value of T[6] implements the inverse discrete cosine transform (iDCT), which is a decorrelation technique used in other auditory feature extraction algorithms (e.g., Mel-frequency cepstral coefficients). Typically, this computation is done as:

$$y_k = \frac{x_0}{\sqrt{N}} + \sqrt{\frac{2}{N}} \sum_{n=1}^{N-1} x_n \cos\left(\frac{\pi}{N} n\left(k + \frac{1}{2}\right)\right) \text{for } 0 \le k < N \qquad (8)$$

In equation (8), $y_k$ is the kth cepstral coefficient, $x_n$ is the nth auditory filter output, and N is the number of auditory filter outputs.

In order to implement the iDCT in a transformation matrix, we can introduce new variables and use matrix notation, resulting in the following equation:

$$k = [0, 1, \ldots, N-1] \qquad 1 \times N \text{ vector}$$

$$s = [\sqrt{2}, 1, 1, \ldots, 1] \qquad 1 \times N \text{ vector}$$

$$T = \sqrt{2N}\, s \odot \cos\left(\frac{\pi}{N}\left(k + \frac{1}{2}\right) \otimes k\right) \qquad N \times N \text{ matrix}$$

$$y = Tx \qquad N \times 1 \text{ vector}$$

In equation (9), ⊙ is the Hadamard (element-wise) product, and ⊗ is the outer product. The matrix T [6] can be precomputed based on the number of auditory filter outputs, and then used in the connection between the auditory nerve layer and the cepstral coefficient layer.

In most embodiments, fewer cepstral coefficients than auditory filters are used because the decorrelated information should require fewer basis functions to capture the majority of relevant information. In these cases, the T matrix is restricted to the first M rows, where M is the desired number of cepstral coefficients.

Table 1 lists parameters used in a comparison between an embodiment of the current invention (NCCs) and a traditional auditory feature vector extraction method, Mel-frequency cepstral coefficients (MFCCs).

TABLE 1

Parameters used for experiments, unless otherwise stated.

| Parameter | Default value | Part of model affected |
| --- | --- | --- |
| MFCC dt | 10 ms | MFCC (frame advance) |
| MFCC window_dt | 25 ms | MFCC (frame size) |
| n_fft | 512 | MFCC |
| deriv_spread | 2 | MFCC (derivative) |
| n_cepstra | 13 | MFCC and NCC |
| n_filters | 32 | MFCC and NCC |

TABLE 1-continued

Parameters used for experiments, unless otherwise stated.

| Parameter | Default value | Part of model affected |
|---|---|---|
| minfreq | 0 | MFCC and NCC |
| maxfreq | 8000 | MFCC and NCC |
| n_derivatives | 1 | MFCC and NCC |
| auditory_filter | Gammatone | NCC auditory periphery |
| neurons_per_freq | 8 | NCC auditory nerve layer |
| neuron_type | Leaky integrate-and-fire | All layers in NCC |
| cepstra_n_neurons | 20 | NCC cepstral coefficient layer |
| deriv_type | Feedforward | NCC derivative layer |
| deriv_n_neurons | 20 | NCC derivative layer |
| deriv_tau_fast | 5 ms | NCC derivative layer |
| deriv_tau_slow | 100 ms | NCC derivative layer |

Figure 3:
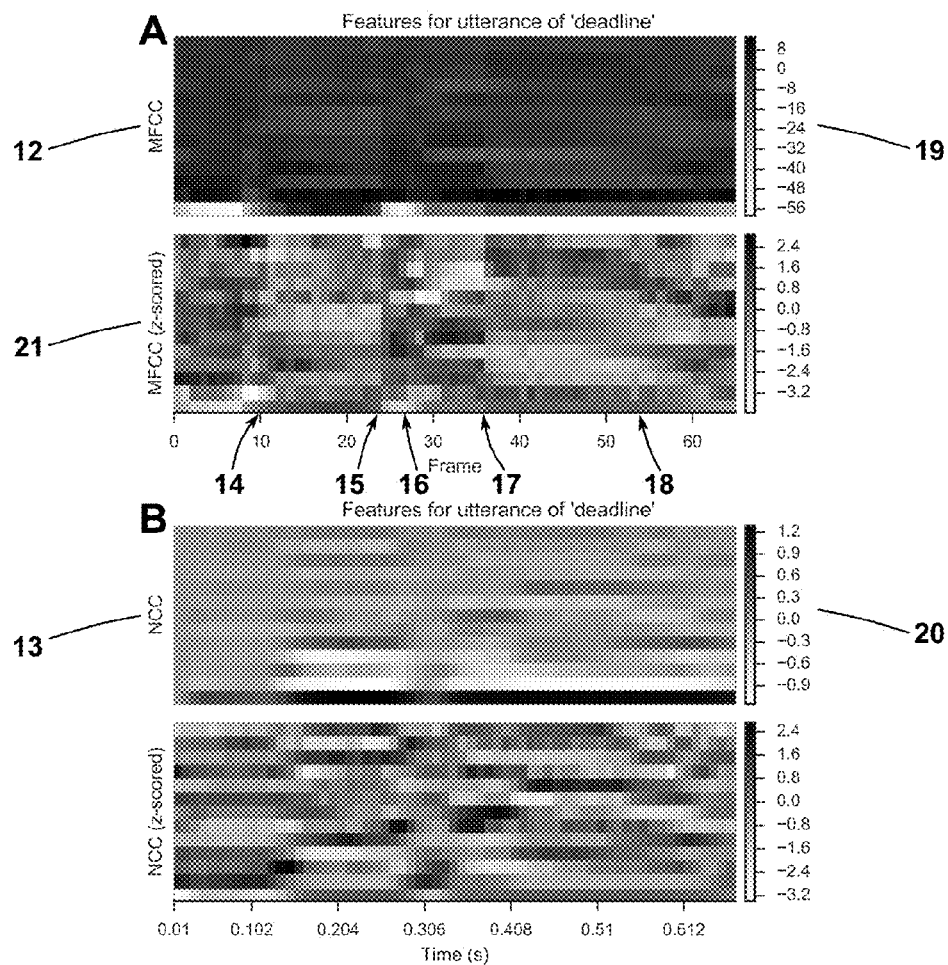
FIG. 3 is the illustration of a plot showing example Mel-frequency cepstral coefficient (MFCC) features and neural cepstral coefficient (NCC) features.

FIG. 3 shows MFCC and NCC auditory features obtained from a 650 ms utterance of the word "deadline" from the TIMIT speech corpus (Garofolo et al., 1993). Both MFCC and NCC features show gross changes at similar time points (approximately 100 ms [14], 240 ms [15], 260 ms [16], 350 ms [17], and 520 ms [18]), which reflect transitions between phones.

However, the two feature vectors differ in several ways. MFCCs have quicker changes (sometimes discontinuities) due to processing the audio signal in discrete frames, as can be seen at 240 ms [15]. NCCs are continuous because the audio is processed online, with samples from the recent past reflected in the internal state of the auditory periphery model. MFCCs have a wider dynamic range than NCCs; in FIG. 3 the MFCC range [19] is approximately −60 to 10, while the NCC range [20] is approximately −1.2 to 1.2. However, the wider range presents a problem for many speech recognition system, so the MFCC is commonly z-scored [21], as in Hain et al. (1999); Graves et al. (2006) and others.

NCCs do not require z-scoring (and often perform better without it) due to most neuron models saturating at a particular firing rate.

In order to evaluate the applicability of NCC features to speech recognition problems, we train a support vector machine (SVM) to classify feature vectors generated from audio samples of pre-segmented phones in region 8 of the TIMIT corpus (Garofolo et al., 1993). Due to the nature of SVMs, all feature vectors used for training and testing must be of equal length. The longest naturally occurring vector is used and other vectors are lengthened using linear interpolation. The training data in region 8 of the TIMIT corpus is used to train SVMs for two equivalent setups that differ only in the feature vector used as input, either NCCs or MFCCs. The test data in region 8 of the TI MIT corpus is used to verify that the results obtained in training generalize to utterances that were not part of the training set.

The metric used to compare the experimental setups using NCCs and MFCCs is classification correctness. Classification correctness is calculated as $N_{correct}/N_{total}$, where $N_{correct}$ is the number of correctly classified phones and $N_{total}$ is the total number of phones in the dataset. Note that classification correctness is not directly comparable with the accuracy metric commonly used in online speech recognition; the experiment described here uses pre-segmented speech and tests whether the feature vectors corresponding to a speech segment are sufficiently similar to speech segments corresponding to the same phone, and are sufficiently different from speech segments corresponding to different phones.

In some cases, the classification correctness metric is shown for NCCs relative to MFCCs. Relative correctness is always shown as the NCC correctness divided by the MFCC correctness, meaning that values significantly above 1 indicate that the SVM using NCC features performed better than the SVM using MFCC features.

Values significantly below 1 indicate that the SVM using NCC features performed worse than the SVM using MFCC features. Values around 1 indicate that the two SVMs perform equally well.

Figure 4:
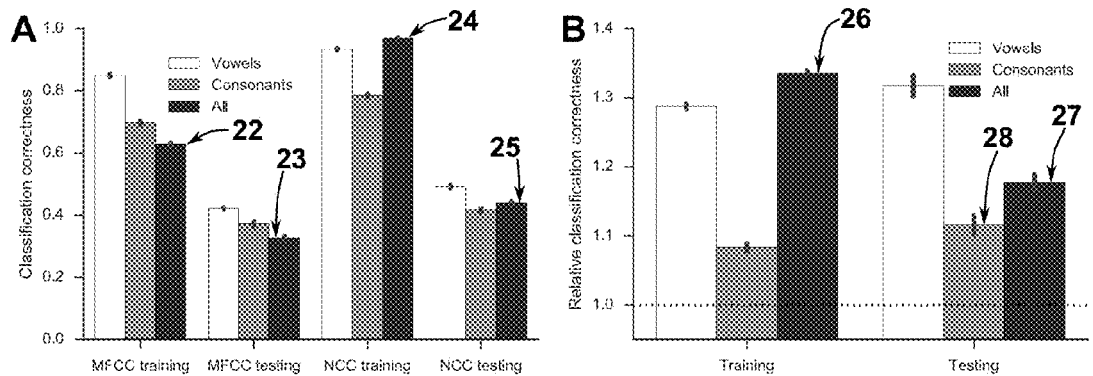
FIG. 4 is the illustration of a plot showing performance of MFCC and NCC features in a classification task of three datasets.

FIG. 4 shows classification correctness and relative correctness for all phones in region 8 of the TI MIT training and testing dataset, as well as the same dataset filtered to only contain consonant phones, and the same dataset filtered to only contain vowel phones. For all three datasets, the SVM using NCC features outperforms the SVM using z-scored MFCC features. Briefly, it can be seen that the SVM using MFCCs for the full dataset achieves around 63% training correctness [22] and 33% testing correctness [23], while the SVM using NCCs achieves around 96% training correctness [24] and 42% testing correctness [25], or a relative correctness of around 1.34 for the training data [26] and 1.18 for the testing data [27].

The dataset yielding the smallest relative difference between the MFCC and NCC setups is the dataset containing only consonant phones; the relative correctness is around 1.11 [28]. The 95% confidence interval is well above 1, denoting that the SVM using NCCs outperforms the SVM using MFCCs. Since this dataset presents the greatest challenge to the NCC feature vector (the current invention), subsequent experiments will use the consonant data set.

Figure 5:
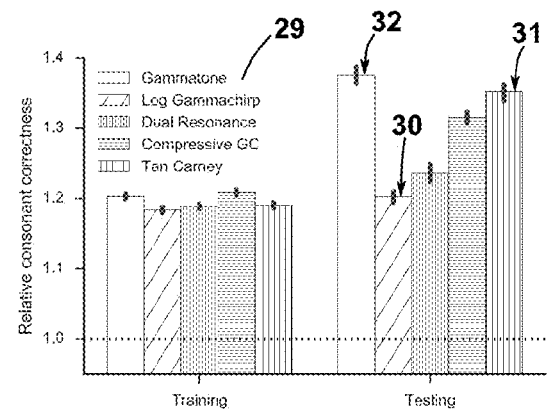
FIG. 5 is the illustration of a plot comparing auditory models used for computing NCCs in a classification task.

FIG. 5 shows the relative correctness using the consonant phone dataset for a modified model that uses more neurons. The condition varied in FIG. 5 is the auditory filter model used [29]. The five filters tested are the Gammatone filter (Johannesma, 1972; De Boer, 1975; Patterson, 1976), log Gammachirp filter (Unoki et al., 2001), dual resonance nonlinear filter (Lopez-Poveda and Meddis, 2001), compressive Gammachirp filter (Irino and Patterson, 2006), and the Tan Carney model (Tan and Carney, 2003). These five filters are ordered in FIG. 5 in complexity order; i.e., the Gammatone filter is the simplest and therefore fastest to compute, while the Tan Carney model is the most complex and therefore slowest to compute. FIG. 5 shows that multiple auditory filter models can be successfully used in the current invention, with more complex auditory filter models performing better in general; for example, the log Gammachirp filter achieves around 1.2 relative consonant correctness [30], while the Tan Carney model achieves around 1.35 relative consonant correctness [31]. The Gammatone filter is an outlier in that its correctness is the highest (around 1.38 relative consonant correctness [32]), yet it is the least complex.

The experiment conducted for FIG. 5 shows that diverse auditory models implemented in software can be integrated into the current invention. Similarly, auditory models implemented in hardware (e.g., Hamilton et al. 2008; Karuppuswamy et al. 2013), including those that produce spiking output (e.g., Chan et al. 2007; Wen and Boahen 2009) can be integrated in the current invention.

The aforementioned embodiments have been described by way of example only. The invention is not to be considered limiting by these examples and is defined by the subsequent claims.

DISCUSSION

The current invention implements decorrelation techniques that are known to be useful in processing audio signals in neural networks. As has been discussed above, an unforeseen advantage of this implementation is that neural networks naturally have a limited operating range due to neuron saturation, which can improve backend statistical processing. However, a disadvantage of the current invention is that the efficiency of neural networks depends critically on how those neural networks are implemented.

Figure 6:
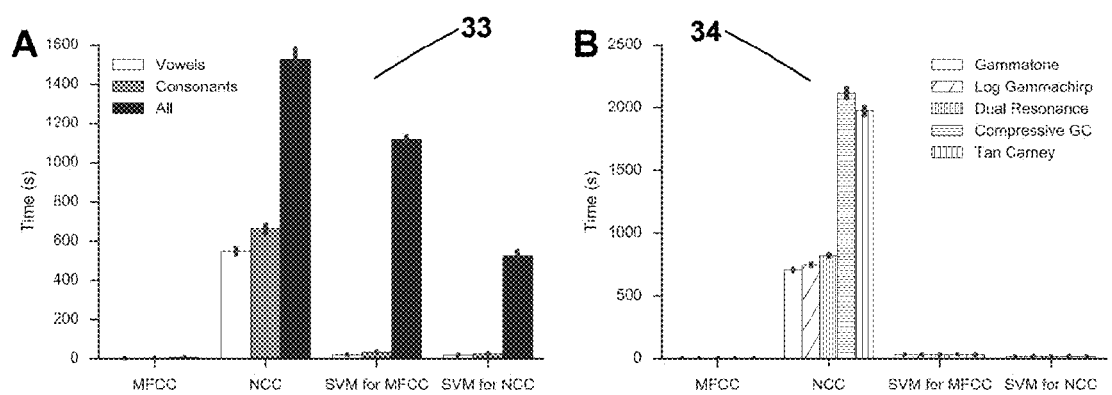
FIG. 6 is the illustration of a plot comparing run times for various aspects of the previously depicted experiments.

FIG. 6 profiles the amount of time taken for different aspects of the experiments previously described, simulated on a general purpose CPU. In [33], the amount of time taken to generate the auditory feature vectors and to train the SVM is shown for the MFCC and NCC setup for the three datasets. It can be seen that NCCs are around three orders of magnitude slower to generate than MFCCs. In [34], it can be seen that more complex auditory filter models further increase the amount of time needed to compute NCCs (the NCCs in FIG. 4 are generated with the Gammatone filter).

The speed issues exemplified in FIG. 6 can be alleviated using special purpose hardware. As previously mentioned, the auditory model can be implemented with one of many hardware devices designed to emulate the human cochlea. Special purpose neuromorphic hardware can also be used to speed up the neural networks used in the current invention. Spiking neuron models created with the principles of the NEF have been run several pieces of neuromorphic hardware, including Spinnaker (Mundy et al., 2015) and Neurogrid (Choudhary et al., 2012). In Mundy et al. (2015), Spinnaker was able to simulate a basal ganglia model an order of magnitude faster than the same model simulated on general purpose hardware.

One key advantage of neural networks over traditional signal processing methods is the ability to improve performance over time by changing connection weights. However, the exemplary embodiment solves for an initial set of weights which remain static during the simulation. While this improves simulation efficiency, accuracy could be improved through the use of online learning rules. Bekolay (2011) details an online error-driven learning rule that can be used in spiking and non-spiking neural networks. In particular, this rule could be used in a unified system in which the backend provides error information to improve signal processing in the frontend.

REFERENCES

T. Bekolay. Learning in large-scale spiking neural networks. Master's thesis, University of Waterloo, 2011.

V. Chan, S.-C. Liu, and A. Van Schaik. AER EAR: A matched silicon cochlea pair with address event representation interface. *IEEE Transactions on Circuits and Systems*, 54(1):48-59, 2007.

S. Choudhary, S. Sloan, S. Fok, A. Neckar, E. Trautmann, P. Gao, T. Stewart, C. Eliasmith, and K. Boahen. Silicon neurons that compute. In *International Conference on Artificial Neural Networks*, pages 121-128. Springer, 2012.

E. De Boer. Synthetic whole-nerve action potentials for the cat. *The Journal of the Acoustical Society of America*, 58(5):1030-1045, 1975.

T. DeWolf. A neural model of the motor control system. PhD thesis, University of Waterloo, 2015.

C. Eliasmith and C. H. Anderson. *Neural Engineering: Computation, representation, and dynamics in neurobiological systems*. MIT press, 2004.

J. S. Garofolo, L. F. Lamel, W. M. Fisher, J. G. Fiscus, and D. S. Pallett. DARPA TIMIT acoustic-phonetic continuous speech corpus CD-ROM. NIST speech disc 1-1.1. *NASA STI/Recon Technical Report N*, 93:27403, 1993.

A. Graves, S. Fernandez, F. Gomez, and J. Schmidhuber. Connectionist temporal classification: labelling unsegmented sequence data with recurrent neural networks. In *International Conference on Machine Learning*, pages 369-376. ACM, 2006.

T. Hain, P. C. Woodland, T. R. Niesler, and E. W. Whittaker. The 1998 HTK system for transcription of conversational telephone speech. In *IEEE International Conference on Acoustics, Speech, and Signal Processing*, volume 1, pages 57-60. IEEE, 1999.

T. J. Hamilton, J. Tapson, C. Jin, and A. VanSchaik. Analogue VLSI implementations of two dimensional, nonlinear, active cochlea models. In *Biomedical Circuits and Systems Conference*, pages 153-156. IEEE, 2008.

J. J. Hopfield. Neurons with graded response have collective computational properties like those of two-state neurons. *Proceedings of the national academy of sciences*, 81(10):3088-3092, 1984.

E. Hunsberger and C. Eliasmith. Spiking deep networks with LIF neurons. *arXiv preprint arXiv:1510.08829*, 2015.

T. Irino and R. D. Patterson. A time-domain, level-dependent auditory filter: The gammachirp. *The Journal of the Acoustical Society of America*, 101(1):412-419, 1997.

T. Irino and R. D. Patterson. A dynamic compressive gammachirp auditory filterbank. *IEEE Transactions on Audio, Speech, and Language Processing*, 14(6):2222-2232, 2006.

P. I. Johannesma. The pre-response stimulus ensemble of neurons in the cochlear nucleus. In *Symposium on Hearing Theory*, pages 58-69. IPO Eindhoven, 1972.

R. Karuppuswamy, K. Arumugham, and S. Priya M. Folded architecture for digital Gammatone filter used in speech processor of cochlear implant. *Electronics and Telecommunications Research Institute Journal*, 35(4):697-705, 2013.

L. Lapicque. Recherches quantitatives sur l'excitation électrique des nerfs traitée comme une polarisation. *J. Physiol. Pathol. Gen*, 9(1):620-635, 1907.

E. A. Lopez-Poveda and R. Meddis. A human nonlinear cochlear filterbank. *The Journal of the Acoustical Society of America*, 110(6):3107-3118, 2001.

A. Mundy, J. Knight, T. C. Stewart, and S. Furber. An efficient spinnaker implementation of the neural engineering framework. In *2015 International Joint Conference on Neural Networks (IJCNN)*, pages 1-8. IEEE, 2015.

R. D. Patterson. Auditory filter shapes derived with noise stimuli. *The Journal of the Acoustical Society of America*, 59(3):640-654, 1976.

Q. Tan and L. H. Carney. A phenomenological model for the responses of auditory-nerve fibers: II. Nonlinear tuning with a frequency glide. *The Journal of the Acoustical Society of America*, 114(4):2007-2020, 2003.

T. Tetzlaff, M. Helias, G. T. Einevoll, and M. Diesmann. Decorrelation of neural-network activity by inhibitory feedback. *PLoS Comput Biol*, 8(8):e1002596, 2012.

B. P. Tripp and C. Eliasmith. Population models of temporal differentiation. *Neural Computation*, 22(3):621-659, 2010.

M. Unoki, T. Irino, and R. D. Patterson. Improvement of an IIR asymmetric compensation gammachirp filter. *Acoustical Science and Technology*, 22(6):429-433, 2001.

B. Wen and K. Boahen. A silicon cochlea with active coupling. *IEEE Transactions on Biomedical Circuits and Systems*, 3(6):444-455, 2009.

The invention claimed is:

1. A method for extracting auditory features from a time-varying signal using computer-implemented neural networks comprising:
encoding a computer-implemented artificial neural network of layers of computer-represented neurons implemented on a computer system to have an auditory filter bank receiving an input audio signal, an auditory nerve layer coupled to the auditory filter bank and a cepstral coefficient layer coupled to the auditory nerve layer;
decomposing by a computer processor the input audio signal into frequency spectrum data using an auditory filter bank that detects power at a set of predetermined frequencies;
representing the detected power at each of the predetermined frequencies with the auditory nerve layer;
decorrelating by a computer processor the detected power at each of the predetermined frequencies and representing the decorrelated information with the cepstral coefficient layer by determining cepstral coefficients for each frequency;
computing by the computer system the derivative of cepstral coefficients from the cepstral layer;
generating by a computer processor an auditory feature vector from a concatenation of decoded vector outputs of the cepstral coefficient layer and the derivative layer;
feeding said auditory feature vector to an audio signal recognizer to obtain auditory recognition results;
wherein coupling weights between the auditory nerve layer and the cepstral coefficient layer decorrelate decoded information in the auditory nerve layer, approximating an inverse discrete cosine transform.

2. The method of claim 1, further comprising by passing the auditory nerve layer.

3. The method of claim 1, wherein coupling weights between two or more layers of neurons are determined through error-driven learning rules.

4. The method of claim 1, wherein coupling weights between two or more layers of neurons are determined through an offline optimization method.

5. The method of claim 1, wherein the auditory filter bank comprises a set of bandpass filters and each bandpass filter is based on a model of an auditory periphery.

6. The method of claim 1, wherein the cepstral coefficient layer is coupled to a temporal derivative layer representing the temporal derivative of the cepstral coefficient layer; wherein the temporal derivative layer includes a plurality of nonlinear components.

7. The method of claim 6, wherein the temporal derivative layer is organized in a feedforward manner with multiple couplings between layers within the temporal derivative layer.

8. The method of claim 6, wherein the temporal derivative layer is organized by using additional layers within the temporal derivative layer to delay signal propagation.

9. The method of claim 6, wherein the temporal derivative layer is organized in a recurrent manner.

10. A system for signal processing in neural networks comprising computer-implemented artificial neural network of layers of computer-represented neurons implemented on a computer system to have an auditory filter bank receiving an input audio signal, an auditory nerve layer coupled to the auditory filter bank and a cepstral coefficient layer coupled to the auditory nerve layer;
wherein:
each layer comprises a plurality of nonlinear components, and each nonlinear component is configured to generate an output in response to the input;
output from each nonlinear component is weighted by coupling weights of corresponding weighted couplings and weighted outputs are provided to coupled modules for each layer;
and wherein the system is configured to
decompose by a computer processor the input audio signal into frequency spectrum data using the auditory filter bank that detects power at a set of predetermined frequencies;
represent the detected power at each of the predetermined frequencies with the auditory nerve layer;
decorrelate by a computer processor the detected power at each of the predetermined frequencies and represent the decorrelated information with the cepstral coefficient layer by determining cepstral coefficients for each frequency;
compute by a computer processor the derivative of cepstral coefficients from the cepstral layer;
generate by a computer processor an auditory feature vector from a concatenation of decoded vector outputs of the cepstral coefficient layer and the derivative layer
feeding said auditory feature vector to an audio signal recognizer to obtain auditory recognition results.

11. The system of claim 10, wherein each nonlinear component has a tuning curve that determines the output generated by the nonlinear component in response to any input and the tuning curve for each nonlinear component may be generated randomly.

12. The system of claim 11, wherein the components are implemented in special-purpose hardware including silicon *cochleae* and neuromorphic hardware.

13. The system of claim 10, wherein the nonlinear components are software simulations of neurons.

14. The system of claim 13, wherein the simulated neurons generate spikes.

* * * * *